(12) United States Patent
Nakazawa

(10) Patent No.: US 8,683,029 B2
(45) Date of Patent: *Mar. 25, 2014

(54) WEB SERVICE SYSTEM, SCHEDULE EXECUTION APPARATUS AND CONTROL METHOD THEREOF

(75) Inventor: Toshiyuki Nakazawa, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,390

(22) Filed: Mar. 28, 2012

(65) Prior Publication Data

US 2012/0185591 A1 Jul. 19, 2012

Related U.S. Application Data

(63) Continuation of application No. 11/551,859, filed on Oct. 23, 2006, now Pat. No. 8,171,074.

(30) Foreign Application Priority Data

Oct. 25, 2005 (JP) .................................. 2005-310500

(51) Int. Cl.
*G06F 15/16* (2006.01)
*G06G 3/00* (2006.01)
*G06F 9/44* (2006.01)

(52) U.S. Cl.
USPC ........................... 709/223; 709/202; 709/218

(58) Field of Classification Search
USPC .................... 709/201–202, 218, 223–224; 718/102–103
See application file for complete search history.

(56) References Cited

U.S. PATENT DOCUMENTS

| | | | | |
|---|---|---|---|---|
| 5,862,340 | A * | 1/1999 | Reynolds | 709/228 |
| 6,373,841 | B1 * | 4/2002 | Goh et al. | 370/389 |
| 6,584,489 | B1 * | 6/2003 | Jones et al. | 718/104 |
| 7,386,586 | B1 * | 6/2008 | Headley et al. | 709/202 |
| 7,844,969 | B2 * | 11/2010 | Bigagli et al. | 718/103 |
| 2002/0073209 | A1 * | 6/2002 | Nienhuis | 709/228 |
| 2002/0143819 | A1 * | 10/2002 | Han et al. | 707/513 |
| 2005/0149935 | A1 * | 7/2005 | Benedetti | 718/102 |
| 2005/0262188 | A1 * | 11/2005 | Mamou et al. | 709/203 |
| 2005/0283534 | A1 * | 12/2005 | Bigagli et al. | 709/229 |
| 2006/0026212 | A1 * | 2/2006 | Tsukerman et al. | 707/200 |

* cited by examiner

*Primary Examiner* — Linglan Edwards
(74) *Attorney, Agent, or Firm* — Canon USA, Inc., IP Division

(57) ABSTRACT

A schedule execution unit accesses a storage unit for storing a call list registered in a database and determines whether or not there is a Web service call to be executed. If the presence of a Web service call to be executed is confirmed, the schedule execution unit reads out the Web service address and process details and calls the Web service. By so doing, the apparatus that provides the function and the apparatus that carries out the call can be separated, thus enabling a particular program to be executed simply and flexibly according to a schedule.

10 Claims, 11 Drawing Sheets

FIG. 3

| EXECUTION TIME | MAY 24, 2005 18:57 | ~301 |
|---|---|---|
| URI | http : //some.com/this/service.ws | ~302 |
| PROCESS DETAILS | \<xml\><br>\<action\><br>\<command\>Reboot\</command\><br>\<device\>172.24.159.35\</device\><br>\</action\><br>\</xml\> | ~303 |

FIG. 7

```
<?xml version="1.0">
<discoverySettings> ~ 701
  <snmpSettings> ~ 702
    <communityName> ~ 703
    public
    </communityName> ~ 703
  </snmp> ~ 702
704 ~ <broadcast>
    <address>
    255.255.255.255      > 705
    </address>
704 ~ </broadcast>
706 ~ <ipRange>
    <addresses> ~ 707
    172.24.159.10-172.24.159.25
    </addresses> ~ 707
    <addresses> ~ 708
    172.25.151.20
    </addresses> ~ 708
    <addresses> ~ 709
    192.168.1.100-192.168.1.130
    </address> ~ 709
706 ~ </ipRange>
  </discovery> ~ 701
```

FIG. 8

| TASK ID | 1023 | ~801 |
|---|---|---|
| EXECUTION TIME | MAY 24, 2005  18:57 | ~301 |
| URI | http : //some.com/this/service.ws | ~302 |
| PROCESS DETAILS | <xml><br><action><br><command>Reboot</command><br><device>172.24.159.35</device><br></action><br></xml> | ~303 |
| EXECUTION STATUS | IN PROCESS | ~802 |

WEB SERVICE SYSTEM, SCHEDULE EXECUTION APPARATUS AND CONTROL METHOD THEREOF

CROSS REFERENCE OF RELATED APPLICATIONS

This application is a Continuation of U.S. patent application Ser. No. 11/551,859 filed on Oct. 23, 2006 which claims the benefit of Japanese Patent Application No. 2005-310500, filed on Oct. 25, 2005, which is hereby incorporated by reference herein in its entirety.

FIELD OF THE INVENTION

The present invention relates to a schedule execution apparatus for executing a particular program according to a schedule. Additionally, the present invention relates to a registration apparatus for registering information for controlling the schedule execution apparatus. Further, the present invention relates to a function providing apparatus that provides a function that the schedule execution apparatus can call. In addition, the present invention relates to a Web service system that employs a schedule execution apparatus, a function providing apparatus and a database apparatus.

BACKGROUND OF THE INVENTION

Conventionally, in computers, functions for executing particular processes according to predetermined schedules are known. Among these are functions that check for OS updates every week on a predetermined day at a predetermined time, boot up the computer every day at a predetermined time, and so forth. In the UNIX-based OS, a 'cron' daemon program is provided that executes prescribed commands in a particular file at a prescribed date and time.

In addition, a technique for a schedule management server, in which the server notifies members at a set time that information for the members and the like have been registered on a shared information Web page in a system that handles information shared among a plurality of members, has also been known (for example, see Japanese Patent Application laid-open No. 2003-150758). In this technique, a person registering information that must be informed to the members, in addition to specific details concerning that information, also registers in the schedule management server the time at which notification to the members is to be carried out. When that set time arrives, the schedule management server then automatically transmits an e-mail notifying the members of at least the fact of registration.

However, since the program that executes the schedule and the unit that provides the function are inextricably linked, the conventional art described above lacks flexibility and function enhancement is difficult. For example, when calling a plurality of functions according to a schedule, either a plurality of sets of schedule call programs and function provision programs must be created or a plurality of functions must be implemented in a set of those programs. As a result, in the former case, it is necessary to provide a plurality of schedule call programs for the process of calling functions according to a schedule. Alternatively, in the latter case, because a single program has to provide a plurality of functions, the program may become complicated. Moreover, the program that executes the schedule and the external program that provides the function may be required to be present in the same computer.

SUMMARY OF THE INVENTION

At least one embodiment of the present invention is conceived in light of the above-described problems of the conventional art, and makes it possible to execute a particular program according to a schedule more simply, and further, more flexibly.

In a Web service system according to an embodiment of the present invention, a schedule execution unit accesses a database storing a registered call list and determines whether or not there is a Web service call to be executed. If the existence of a Web service call to be executed is confirmed, the Web service system reads out the address of and process details for the Web service from the database and calls the Web service. Therefore, the unit that provides the function to be called, the unit that carries out the call, and the database unit that stores the call list can be handled independently.

According to an aspect of the present invention, at least one embodiment is directed to a Web service system in which a schedule execution apparatus, a database apparatus and a function providing apparatus implementing a Web service are communicably connected. The database apparatus includes a storage unit adapted to store call information containing address information for calling a Web service, time information at which the Web service should be called, and process information that describes the process that should be executed by the Web service, wherein the call information is stored as a record in a function call list by the storage unit, such function call list being updatable when accessed by an external unit. The schedule execution apparatus includes a check unit adapted to access the database apparatus and check whether or not there is a Web service call to be executed. The schedule execution apparatus further includes a read-out unit adapted to read out, in a case in which the check unit determines that there is a Web service call to be executed, the address information and the process information of the Web service to be executed from the database apparatus. The schedule execution apparatus further includes a calling unit adapted to generate a message for calling the Web service to be executed according to the read-out process information and transmit the message according to the read-out address information. The function providing apparatus includes a process execution unit adapted to execute a process according to the message based on the message received from the schedule execution apparatus and on a function that the Web service provides, wherein, when a process according to the process execution unit is completed, the schedule execution apparatus is notified of termination of the Web service.

With such a configuration, an embodiment of the present invention makes it possible to execute a particular program according to a schedule more simply, and further, more flexibly. In an embodiment, the additional flexibility is achieved by being able to independently control a database apparatus that stores call information, a function providing apparatus that executes a Web service and a schedule executing apparatus that generates messages for calling Web service to be executed according to a schedule. Moreover, in an embodiment, because the database apparatus, the function providing apparatus and the schedule executing apparatus are provided as separate devices in a Web-based system (also referred to herein as "Web service system"), the embodiment provides additional flexibility in terms of physical locations of the devices in that these devices are not required to be present at the same location and can be independently managed and controlled at different locations (i.e., there is no restriction as to the physical location of each device). Furthermore, because the devices are communicably connected to each other in a Web-based system, the embodiment provides additional flexibility in terms of selecting a communication protocol that can be used between the devices.

Further features of the present invention will become apparent from the following description of exemplary embodiments with reference to the attached drawings.

BRIEF DESCRIPTION OF THE DRAWINGS

FIG. 3 is a diagram showing an example of a function call list record structure and data stored in the database 105 in the first embodiment of the present invention;

FIG. 7 is a diagram showing an example of search conditions input in the setting screen shown in FIG. 6 converted to XML format;

FIG. 8 is a diagram showing an example of record data registered in the function call list stored in the database 105 in the third embodiment of the present invention;

DESCRIPTION OF THE EMBODIMENTS

Exemplary embodiments of the present invention will now be described in detail in accordance with the accompanying drawings.

First Exemplary Embodiment

Figure 1:
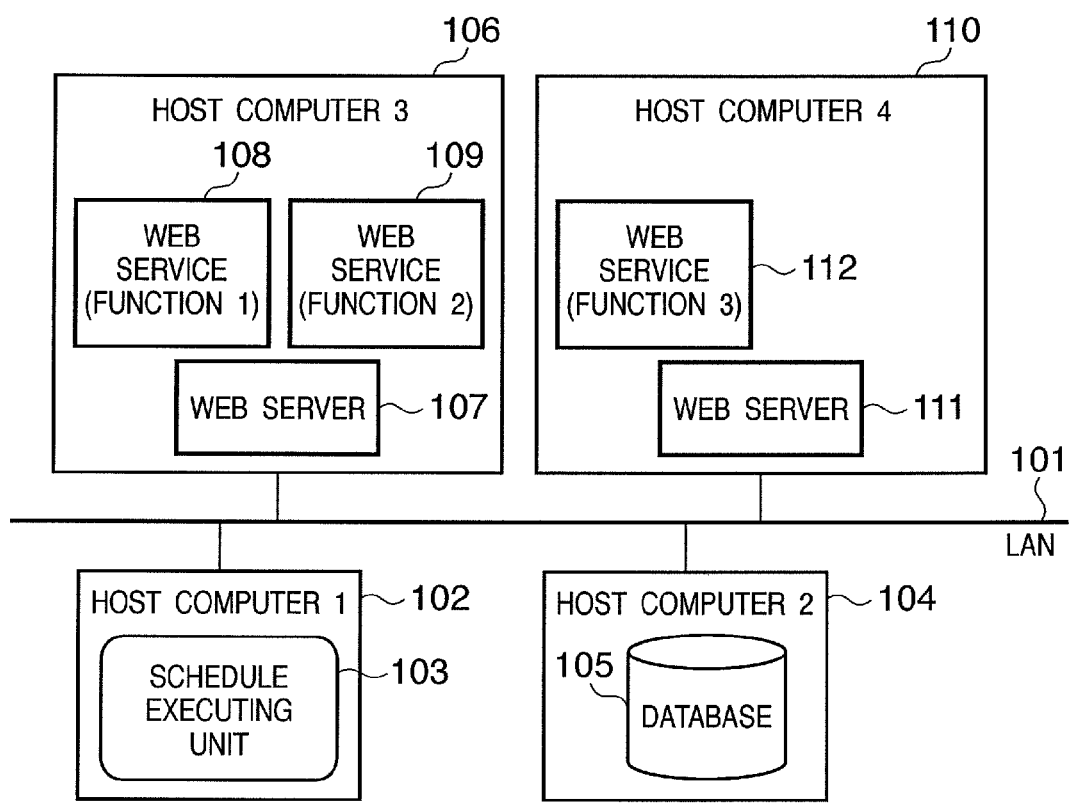
FIG. 1 is a diagram showing an exemplary configuration of a computer network capable of adapting a schedule execution apparatus according to a first embodiment of the present invention.

FIG. 1 is a diagram showing an exemplary configuration of a computer network in which a schedule execution apparatus according to a first embodiment of the present invention can be applied.

The computer network shown in FIG. 1 comprises a local area network (LAN) 101 to which are connected host computers 1 through 4 (102, 104, 106, 110). A schedule execution unit 103 for calling a function according to a specified schedule runs on host computer 1 (102), which functions as the schedule execution apparatus according to the present embodiment. As described above, the schedule execution unit 103 can be implemented as a program (for example, a resident program called either a daemon or a service) that runs on host computer 1 (102).

A database 105 operates in host computer 2 (104), and in the database 105 are stored details of the function that the schedule execution unit 103 calls and schedule information. The database 105 is implemented by a database application that uses data files stored on a HDD 1108 (shown in FIG. 11), for example.

Web servers (Web server applications) 107 and 111 for providing Web service server functions operate in host computer 3 (106) and host computer 4 (110), respectively. Application programs (Web services) 108, 109, 112, each of which implements a particular function (service) that can be called from the schedule execution unit 103, run on Web servers 107 and 111. Thus, each of host computer 3 (106) and host computer 4 (110) functions as a function providing apparatus.

It should be noted that although the host computers 1 through 4 (102, 104, 106 and 110) are drawn as separate computers in FIG. 1, it is not necessary that they be separate computers. Thus, alternatively, for example, the schedule execution unit 103, the Web servers 107 and 111, and the Web services 108, 109 and 112 that run on the Web servers 107 and 111 may be present on the same host computer, with the database 105 on another host computer used from such a host computer.

Figure 11:
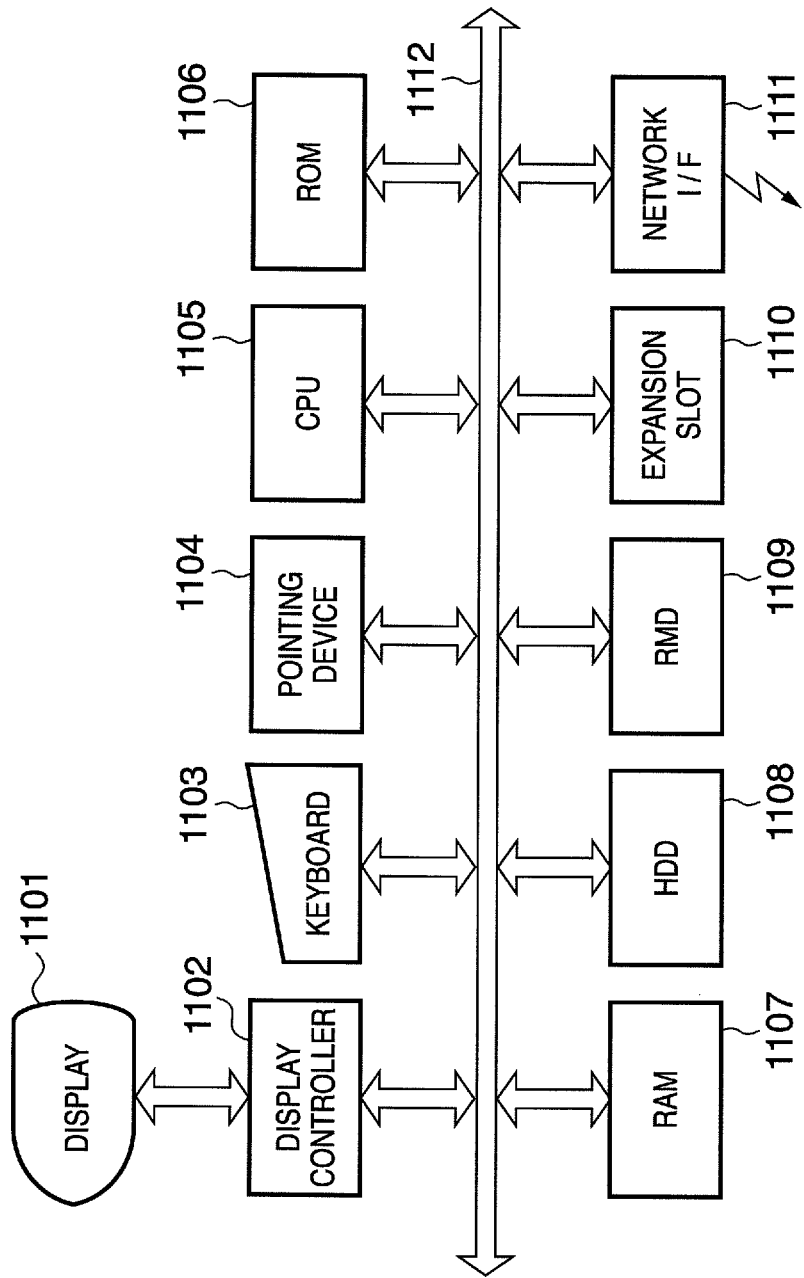
FIG. 11 is a block diagram showing one exemplary configuration of host computers 1-4 and a PC according to an embodiment of the present invention.

FIG. 11 is a block diagram showing one exemplary configuration of the host computers 1 through 4 (102, 104, 106, 110) according to the present embodiment. It should be noted that the host computers 1 through 4 according to the present embodiment can be configured as personal computers or other computer devices.

In FIG. 11, a display 1101 displays information on data being processed by an application program, various message menus and the like, and is composed of a CRT (Cathode Ray Tube), LCD (Liquid Crystal Display) or the like. A display controller 1102 controls the screens that are displayed on the display 1101. A keyboard 1103 and a pointing device 1104 are used to input characters, to indicate icons and press buttons in a GUI (Graphical User Interface), and so forth. A CPU (Central Processing Unit) 1105 exerts overall control of the host computer.

A ROM (Read Only Memory) 1106 stores programs, parameters and the like that the CPU 1105 executes. A RAM 1107 is used as a work area when the CPU 1105 executes the programs, as an evacuation area during error processing, and so forth.

The hard disk drive (HDD) 1108 and the removable media drive (RMD) 1109 function as external storage devices. The RMD 1109 is a device for writing to and reading from a removable recording medium, and may be a flexible disk drive, an optical disk drive, a magneto-optical disk drive, or a memory card, as well as a removable HDD.

It should be noted that the various functions of the host computers 1 through 4 are implemented by programs for implementing the schedule execution unit 103, the Web servers 107 and 111, the Web services 108, 109 and 112 that provide functions 1 through 3 and the database 105.

These programs, OS, browser and other application programs, data, libraries and the like are stored on one or more of the ROM 1106, the HDD 1108 and the RMD 1109 (recording medium) depending on the application.

An expansion slot 1110 is an expansion card attachment slot that conforms to PCI (Peripheral Component Interconnect) bus standards, for example, and enables attachment of a variety of expansion boards such as a video capture board, a sound board, a GPIB (General Purpose Interface Bus) board and the like.

A network interface 1111 has a wire communication function that conforms to USB (Universal Serial Bus) standards, IEEE 1394 standards, LAN or the like, or a wireless communication function that conforms to IEEE 802.11a/b standards, Bluetooth standards or the like. The host computers 1 through 4 (102, 104, 106, 110) according to the present embodiment are connected to a LAN 101 using the network interface 1111 so as to be able to communication with other host computers. A bus 1112 includes an address bus, a data bus and a control bus, and connects the above-described units to each other. In addition, the above-described configuration also has a calendar clock, from which the current date and time can be acquired.

Figure 2:
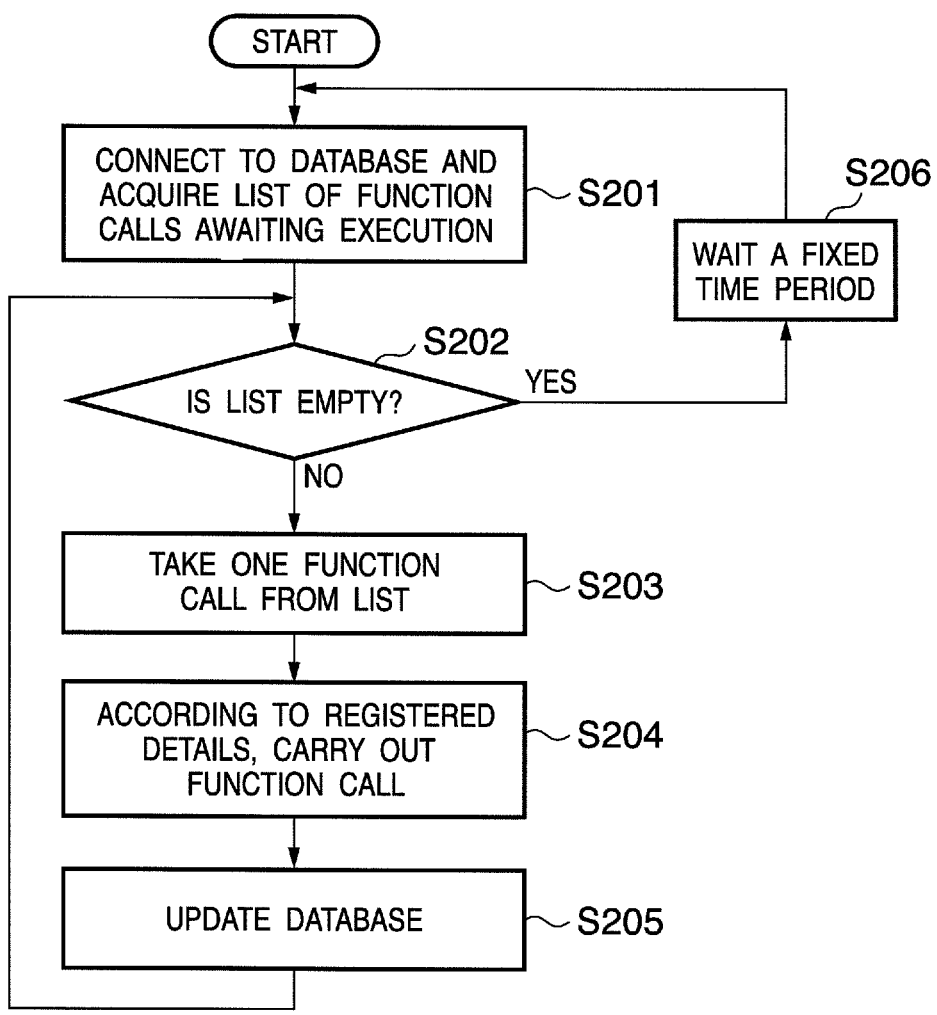
FIG. 2 is a flow chart illustrating steps in a process of calling a Web service according to a schedule executed by a schedule execution unit 103 based on registration information registered in a database 105.

FIG. 2 is a flow chart illustrating steps in a process of calling a Web service according to a schedule that is executed by the schedule execution unit 103 based on registration information registered in the database 105 that acts as a storage unit.

First, in step S201, the schedule execution unit 103 acquires from the database 105 a list of function calls whose execution dates and times are prior to the current date and time of the calendar clock, and further, have not been executed. In step S202, the schedule execution unit 103 checks whether or not there are entities (records) in the list, and if there are no records, after waiting for a fixed period of time in step S206, the schedule execution unit 103 returns to the function call list acquisition of step S201.

FIG. 3 is a diagram showing an example of a function call list record structure and data stored in the database 105 in the first embodiment.

As shown in FIG. 3, each record in the list includes an execution date and time 301 as function call time information and a URI (Uniform Resource Identifier) 302 as address information for calling the Web service implementing the function. Further, each record includes a character string 303 that describes the process details to be executed by the Web service. The character string 303 described in a markup language (here XML (eXtensible Markup Language)) is transferred to the Web service specified by the URI address during a function call. In the example shown in FIG. 3, a process that specifies restarting (rebooting) of the device at IP address 172.24.59.35 is described as the process details at the Web service.

It should be noted that, although in the example shown in FIG. 3, the host computer (Web server) with the call Web service is specified by domain name, alternatively, it may be specified directly by IP address.

If in step S202 there are records in the acquired function call list, in step S203 the schedule execution unit 103 takes one record from the list. Then, according to the URI address 302 described in the record thus acquired, the schedule execution unit 103 calls either Web service 108, 109 or 112 that provides the function.

When transferring the character string 303 that describes the process details to the called Web service, it is possible to use, for example, SOAP (Simple Object Access Protocol) for communicating between objects using a protocol such as HTTP (HyperText Transfer Protocol) or FTP (File Transfer Protocol) to transfer messages written in XML.

Then, when notified from the called Web service that the process has ended successfully, in step S205 the schedule execution unit 103 records the completion of the function call in the function call list in the database 105. Alternatively, by the deletion or the like of an executed record from the function call list, the schedule execution unit 103 carries out a process of updating the database (function call list) so that the executed record is not selected during the next execution of step S201.

Thereafter, the processes of step S202, S203 and S204 are repeated until the list is empty, after which the routine returns to step S201 via step S206.

Figure 4:
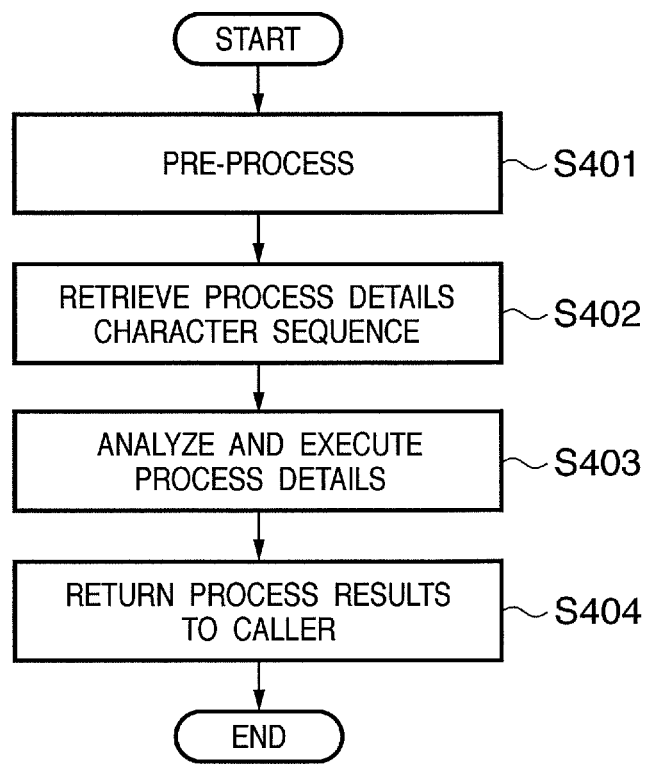
FIG. 4 is a flow chart illustrating steps in a process performed on a host computer side that executes the called function.

FIG. 4 is a flow chart illustrating steps in a process performed on the host computer 3, 4 (106, 110) that executes the called function.

The Web servers (107, 111), when they receive a function call message from the schedule execution unit 103 (FIG. 3), start processing. In step S401, they examine the certification of the schedule execution unit 103 and the validity of the call. Once it is confirmed that the received function call message is valid, in step S402 the Web servers (107, 111) extract from the received function call message the process details to be transferred to the Web service specified by the URI.

For example, in a case in which the character string 303 that describes the process details are embedded as an attachment to a SOAP message as described above, the Web servers (107, 111) extract the function call message attachment. Next, in step S403, the Web servers (107, 111) analyze the character string 303 that describes the process details and, for example, parse the XML document, and convert the described request into a request message suitable for the Web service to be called. Then, when processing results are received from the called Web service, in a last step S404 the processing results are returned to the schedule execution unit 103 that originated the request and processing is ended.

Thus, as described above, the present embodiment can separate the schedule execution unit that calls a function according to a schedule and the unit that provides a function (Web service), enabling processing to be reduced and simplified. In addition, limitations concerning the disposition of the schedule execution unit and the function provision unit can be eased, enabling the different units to be placed in any locations in which they can communicate with each other. In addition, since a plurality of functions calls can be executed from a single schedule execution unit, function enhancement and revision are easy.

In other words, a function installed as a Web service server is called at the registered date and time together with the Web service server URI and the character string that describes the process details of the function to be executed, thus enabling the program that calls a function according to a schedule and the program that provides the function to be clearly separated, and thus enabling a plurality of function calls to be carried out with a single schedule execution unit and as a result enabling processing to be reduced and simplified. In addition, the need for the program that calls a function according to a schedule and the program that provides the function to be on the same host computer can be eliminated, thus enabling the enhancement and the convenience of the program to be improved.

Second Exemplary Embodiment

In the first embodiment, a description was given of a case in which the function call list that describes the process (schedule process) that is to be executed according to a schedule is registered in advance in the database 105. By contrast, in the present embodiment, the user can register new records in the function call list.

Figure 5:
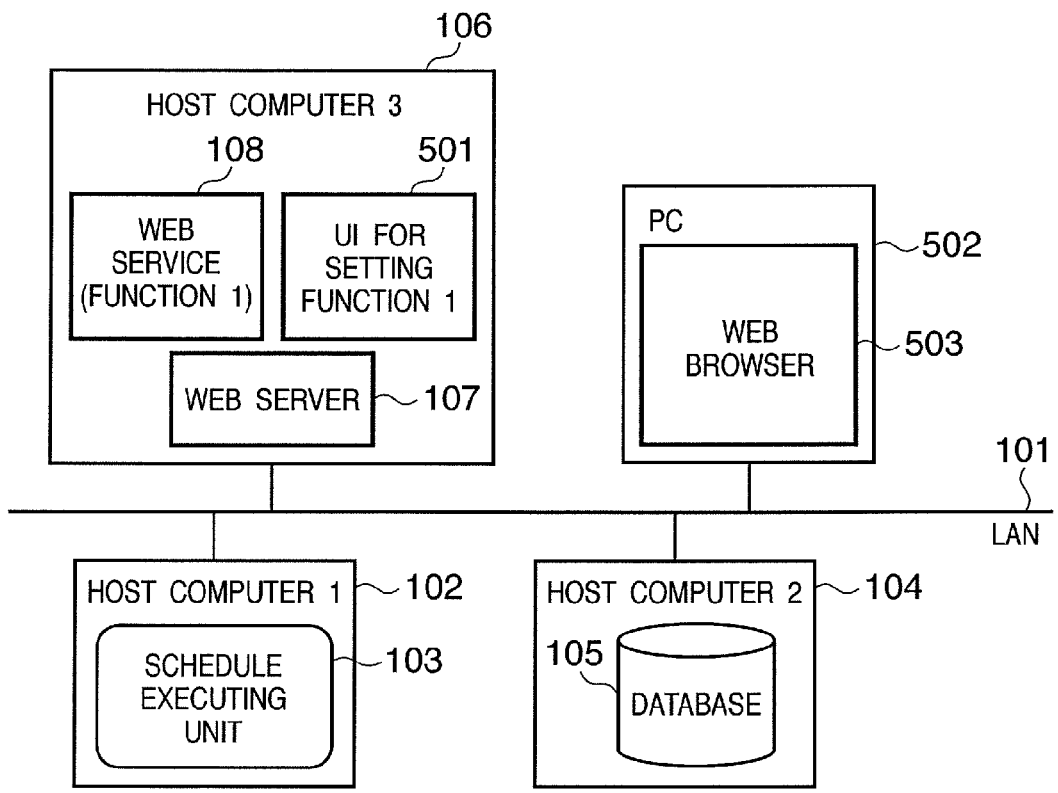
FIG. 5 is a diagram showing an exemplary configuration of a computer network according to a second embodiment of the present invention.

FIG. 5 is a diagram showing an exemplary configuration of a computer network according to a second embodiment of the present invention, in which constituent elements identical to those shown in FIG. 1 are assigned identical reference numerals. In this embodiment, a PC 502 that the user uses is provided in place of the host computer 4 (110) in the configuration shown in FIG. 1. The PC 502 may, for example, be an ordinary computer having the configuration described with reference to FIG. 11. The PC 502 functions as a registration apparatus for registering call information that controls the host computer 1 (102) which functions as the schedule execution apparatus in the database 105.

Then, a schedule process is input from a schedule process registration application (in this case, a Web browser application) running on the PC 502 using a UI that the host computer 3 (106) provides. The schedule process that is input is registered in the database 105 of the host computer 2 (104) by the host computer 3 (106) as a new record of the function call list.

In FIG. 5, a UI 501 for setting the Function 1 is newly provided in the host computer 3 (106). The UI 501 for setting the Function 1 exists in host computer 3 (106) and provides a user interface for registering a call schedule process that calls a Web service (108) that provides Function 1 from the PC 502. As described above, in this embodiment, the Web browser application (hereinafter simply Web browser) that runs on the PC 502 is used as a schedule process registration application. As a result, the UI 501 for setting the Function 1 transmits data for displaying the UI for registration on the Web browser 503 in accordance with a request from the Web browser 503. Specifically, the UI 501 transmits form data written in HTML or a script language to the Web browser 503.

The UI 501 for setting the Function 1, when it receives the schedule process data that is input via the transmitted form data from the Web browser 503, registers data in the format shown in FIG. 3 in the database 105 as a new record in the function call list.

In the present embodiment, the Web service (108) that is present in the host computer 3 (106) provides a function of a SNMP (Simple Network Management Protocol) manager as the Function 1. Therefore, a schedule that calls a process using SNMP can be set from the Web browser 503.

Figure 6:
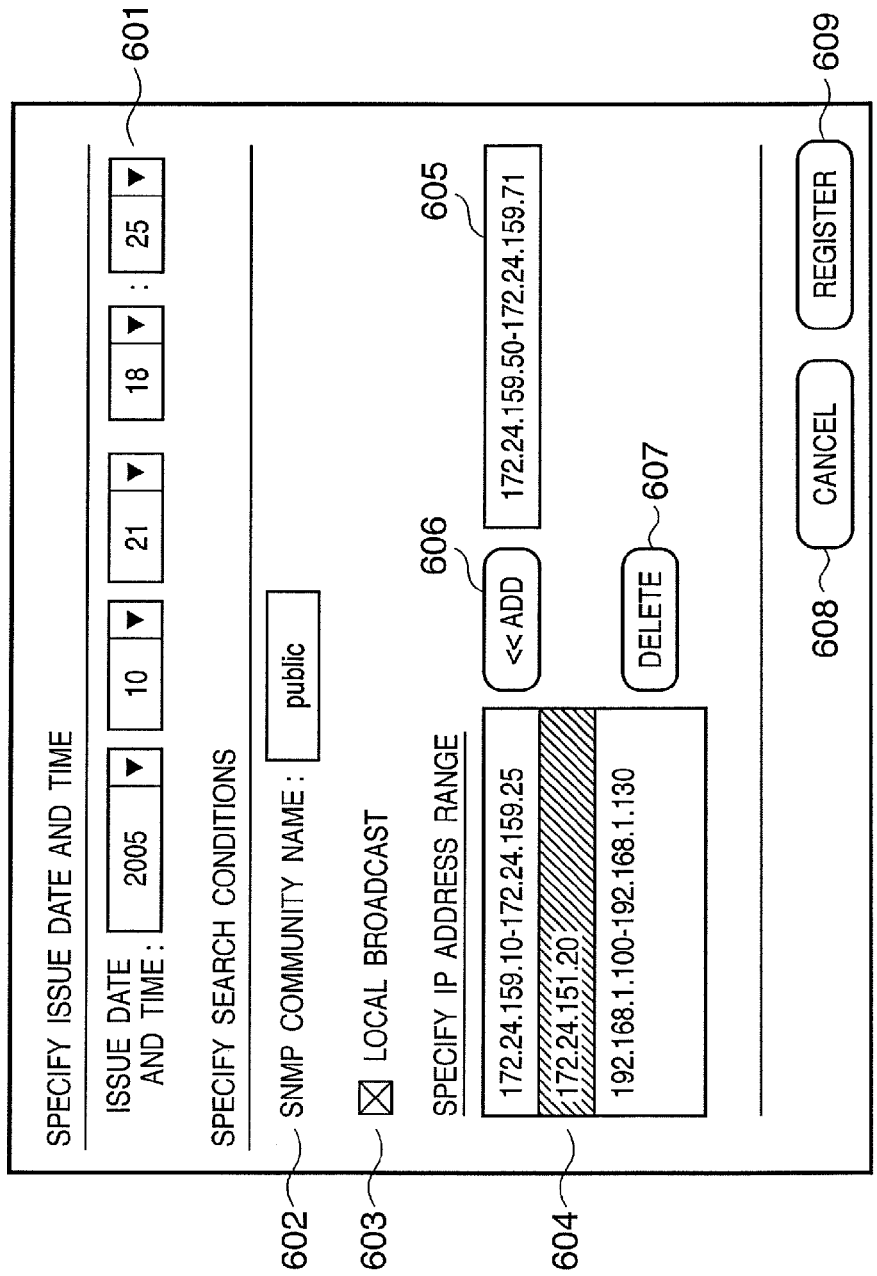
FIG. 6 is a diagram showing an example of a user interface used for setting that is provided and displayed by a Web browser 503 using a UI 501 for setting a Function 1 in the second embodiment of the present invention.

FIG. 6 is a diagram showing an example of the user interface used by the UI 501 for setting the Function 1 that is provided and displayed by the Web browser 503.

In the present embodiment, the UI 501 for setting the Function 1 provides a UI for setting for calling, at a desired date and time, a function that searches for an SNMP client existing on the LAN 101 using SNMP commands. The SNMP client is a device, such as a computer or a printer, a router, or the like.

In the setting UI shown in FIG. 6 (also called a setting screen), an input unit 601 specifies the data and time that the user wishes to call the Function 1 using the schedule execution unit 103.

A text box 602 is provided for inputting the SNMP community name. A check box 603 is provided for setting whether or not to use a local broadcast in searching for an SNMP client on the local sub-net to which the host computer 3 (106), on which the Web service that provides the Function 1 runs, belongs. Reference numeral 604 designates a list of search target IP addresses using unicast.

When specifying the IP address range, the beginning address and the ending address are sandwiched around a hyphen "-" as shown in the drawing. For example, the first line of list 604 specifies detecting SNMP clients at each of the 16 IP addresses from IP address 172.24.159.10 to IP address 172.24.159.25.

When adding an address or an address range to the list 604, the user inputs the IP address or the IP address range that he or she wishes to add to the IP address input unit 605 and presses an add button 606. Conversely, when deleting an IP address or an IP address range from the list 604, the user selects from the list 604 the IP address or IP address range that he or she wishes to delete and presses a delete button 607. In the example shown in the drawing, the IP address "172.24.151.20" is selected, and if in this state the delete button 607 is pressed, that address is deleted from the list 604. It should be noted that pressing a button in the GUI means the operation of clicking on a button included in the GUI with a mouse, for example.

If a cancel button 608 is pressed by the user, the input is discarded and the setting screen is closed. If a register button 609 is pressed by the user, the UI 501 for setting the Function 1 converts the search conditions from 602 to 604 into character string format (for example XML format). Then, the date and time of execution specified by 601, together with the URI address of the Web service 108 that provides Function 1, are registered in the database 105.

FIG. 7 shows an example of search conditions (602-604) input in the setting screen shown in FIG. 6 converted to XML format, which corresponds to the character string shown in FIG. 3. A tag 701 declares that the settings relate to a search. A tag 702 defines that the settings relate to SNMP, and further, a tag 703 therewithin defines that the SNMP community name is the "public" that was input in 602.

A tag 704 indicates settings relating to a broadcast search, and by a tag 705, the execution of a local broadcast search specifying "255.255.255.255" as the receiving IP address is specified, which corresponds to the check box 603 shown in FIG. 6 being checked. Finally, settings relating to a search of an IP address, which is specified by unicast, are carried out by a tag 706. Tags 707, 708 and 709 are each used to specify the IP address ranges specified by the list 604 shown in FIG. 6.

Schedule process list records generated and registered as described above are executed at the specified date and time by the schedule execution unit 103 as described in the first embodiment.

Thus, as described above, the present embodiment enables more flexible schedule processes because the user can set the schedule process details.

Third Exemplary Embodiment

In some cases, a function that searches for a device, such as a computer or a printer, or a router or the like on the network 101 as in the example of the second embodiment, is started and the processing by the called function may not end within a short time period but instead can last several tens of minutes to several hours. With function calls using a Web service, it is desirable that execution results be returned to the Web service caller within a relatively short period of time (usually approximately several tens of seconds). As a result, when carrying out a time-consuming process utilizing a function call that uses a Web service, it is desirable to provide some countermeasure.

In the present embodiment, a time-consuming process is implemented using the above-described Web service call. In this embodiment as well as with the second embodiment, an example of a function call in the computer network shown in FIG. 5 is described.

FIG. 8 is a diagram showing an example of record data registered in a function call list stored in the database 105 in the third embodiment of the present invention.

As is clear from a comparison with FIG. 3, a task ID 801 and an execution status field 802 have been added to the function call list record of the present embodiment.

The task ID 801 is a number (primary key) for uniquely identifying a record in the function call list in the database 105. The execution status field 802 shows the current state of execution of the function call. Depending on the state of execution, the execution status field 802 shows such values as "awaiting execution", "being executed", "successfully completed", "error; terminated". Specifically, when the "register" button 609 in the setting screen shown in FIG. 6 is pressed, the execution status field 802 shows "awaiting execution" at the date and time registered in the database 105 by the host computer 3 (106) UI 501 for setting the Function 1.

Then, in step S204 shown in FIG. 2, for example, if carrying out a call of Function 1, the Web server 107 of the host computer 3 (106) on which the Web service 108 that provides Function 1 is running makes a determination of the processing time. In other words, a determination is made as to whether or not the process according to the called Function 1 will be completed within a predetermined Web service request time period. This determination can be carried out, for example, by analyzing the details of Function 1 and the character string 303 representing the process details received from the call originator.

Then, if it is determined that the process will be completed within the Web service request time period, the Web service is called as in the first embodiment. Then, when the Web service process results are received, in step S404 shown in FIG. 4, depending on the process results, either "successfully completed" or "error; terminated" is written to the execution status field 802 of the relevant record in the database 105.

At this point, the task ID 801 is transferred as a function call parameter from the schedule execution unit 103 to the Web service that provides the Function 1 via the Web server 107. Then, the Web service 108 running on the Web server 107 identifies the corresponding record data in the database 105 by the task ID 801 and updates the execution status field 802.

Next, a description is given of the process performed in a case in which it is determined that the process will not be completed within the Web service request time period.

Figure 9:
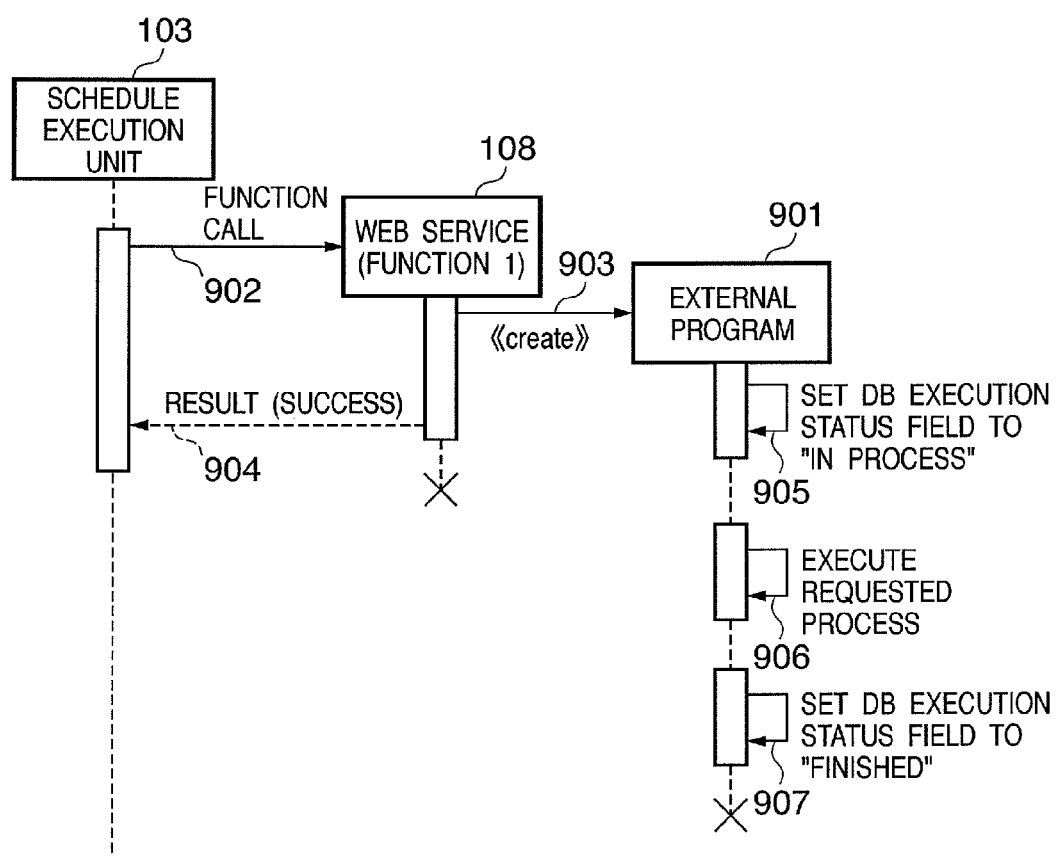
FIG. 9 is a diagram showing operations of modules in chronological sequence, in a case in which a time-consuming process is carried out using a Web service call.

FIG. 9 is a diagram showing operations of modules in chronological sequence, in a case in which a time-consuming process is carried out using a Web service call.

The schedule execution unit 103 periodically checks the database 105, searching the registration list for record data whose execution date and time 301 is prior to the current date and time, and moreover, whose execution status field reads: "awaiting execution". The schedule execution unit 103 then attaches to the URI address 302 of each such piece of record data the character string contained in the process details 303 and carries out a Web service call (902). When a Web service call is carried out, the Web server 107 receives the request and activates the Web service 108 that corresponds to the URI 302.

The activated Web service 108, when a request for function execution is received, for example, activates an external program (function process program) 901 for processing the process details 303 that is provided in advance in the host computer 3 (106) (903). Then, the process is transferred to the external program 901, which then returns its own provisional processing results to the schedule execution unit 103 that is the caller of the Web service 108 and ends the service (904), thus enabling the Web service 108 to respond with processing results within a predetermined time period after the call.

At the same time, the external program 901 that carries out the actual processing of the requested function, when it starts processing first uses the task ID 801 transferred from the Web service 108 and searches the registration list inside the database 105. Then, the external program 901 updates the execution status field 802 of the corresponding record data to "being executed" (905) and executes the process according to the requested process details 303 (906). When the process is finished, the external program 901 updates the execution status field 802 in the database 105 to either "successfully completed" or "error; terminated" depending on the processing results and ends the program (907).

Then, the schedule execution unit 103 can grasp the actual processing results of the called process by referencing the execution status field 802.

Figure 10:
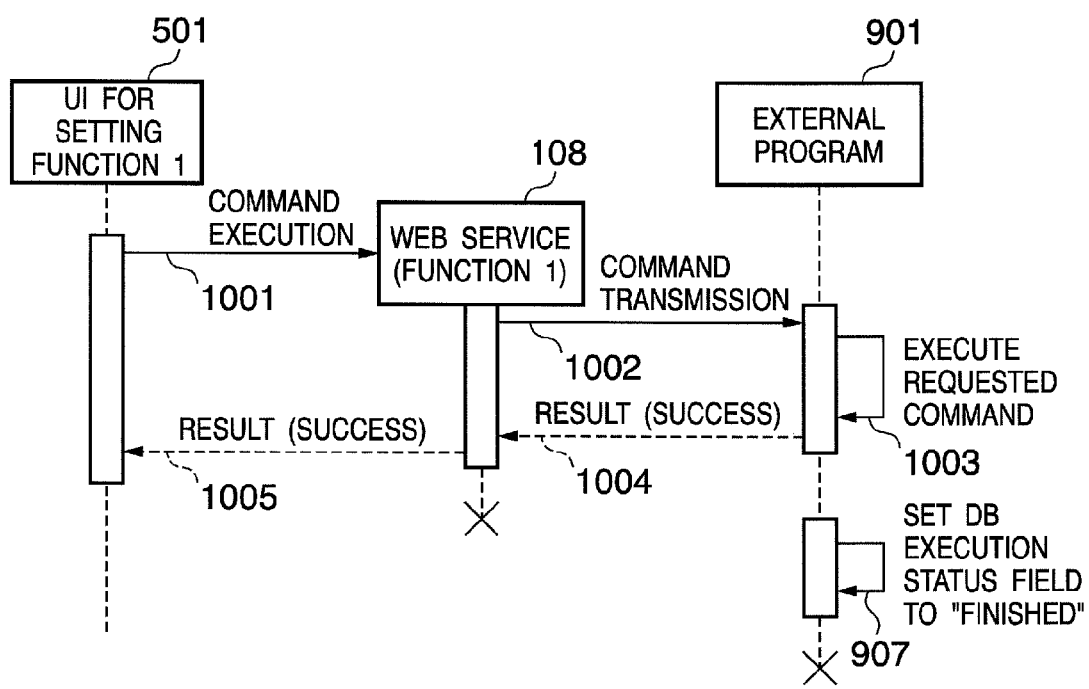
FIG. 10 is a diagram showing a sequence when reporting a request or the like from a user to an external program that is in the process of executing a process.

FIG. 10 is a diagram showing a sequence when reporting a request or the like from the user to the external program 901 that is in the process of executing a process.

In this example, the request from the user is specified from the Web browser 503 running on the PC 502 using the UI 501 for setting the Function 1 that the host computer 3 (106) provides.

Unlike the UI shown in FIG. 6, when the UI (module) 501 for setting the Function 1 in this case is called from the Web browser 503, the UI (module) 501 for setting the Function 1 accesses the database 105 and acquires the state of execution from the execution status field 802 corresponding to the function that is being executed from among the records in the function call list. Then, the UI 501 for setting the Function 1 provides a UI that includes at least a message showing the state of execution as well as a "cancel" button to the Web browser 503 as a request instruction screen.

If the user clicks on the "cancel" button included in the request instruction screen that is displayed by the Web browser 503 and requests cancellation of the function call that is being executed, this operation is reported to the UI 501 for setting the Function 1. The UI 501 for setting the Function 1 then calls the Web service 108 together with the "cancel" command (1001).

When the Web service 108 receives the cancel command, the Web service 108 communicates with the external program 901 using RPC (Remote Procedure Call) or the like and transmits a "cancel" request to the external program 901 (1002). The external program 901, having received the "cancel" request, processes the requested command (1003) and returns the process results to Web service 108 that originated the call (1004). The Web service 108 takes the received results and then further returns them to the UI 501 for setting the Function 1 that originated the Web service call, and the UI, as necessary, transmits the results as HTML data to the Web browser 503, thus enabling the user to confirm the results of the request via the Web browser 503. Finally, the external program 901 updates the state of execution inside the database 105 to either "successfully completed" or "error; terminated" depending on the state of execution of the cancelled process (907).

By having the Web service transfer the process to an external program, the present embodiment enables a process to be executed using a Web service call even if the process is one that does not finish within the required time period of the Web service.

In addition, by having the external program reflect the actual process status (state of execution) in the database 105, and moreover, by enabling the execution status to be confirmed from the Web browser that the user uses, the user can determine the actual process status. In addition, since it is possible to communicate with the external program through the Web service, user requests concerning processes being executed can be communicated.

Other Exemplary Embodiments

The above-described embodiment can also be implemented as software by a computer (or a CPU, MPU or the like) of a system or an apparatus.

Accordingly, since a computer implements the functional processes of the present invention, a program supplied to and installed in the computer itself also accomplishes the present invention. In other words, the computer program for implementing the functional processes of the invention is itself also included within the scope of the present invention.

In that case, so long as the system or apparatus has the capabilities of the program, the program may be executed in any form, such as an object code, a program executed by an interpreter, or script data supplied to an operating system.

In this case, the computer program for implementing the functional processes of the present invention by computer are supplied by stereoscopic or by wire/wireless communications. Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is downloaded to a connected client computer accessing the server. In this case, the program data file may also be divided into a plurality of segment files and the segment files distributed among different servers.

In other words, a server device that downloads program data files that implement the functional processes of the present invention by computer to multiple users is also covered by the claims of the present invention.

It is also possible to encrypt and store the program of the present invention on a storage medium such as a CD-ROM, distribute the storage medium to users, allow users who meet certain requirements to download decryption key data from a website via the Internet, and allow these users to decrypt the encrypted program by using the key data, whereby the program is installed in the user computer.

Besides the cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A computer system provided by at least one computer apparatus, comprising:
   a requesting unit;
   a Web server unit;
   a Web service unit;
   a search function setting UI (user interface) unit which provide a user interface including an item for setting whether or not a broadcast in searching for a printer, and an item for setting an IP address of a printer to be searched by unicast; and
   a storage unit which stores a plurality of records, each record including a date and time at which a search is to be performed, a setting indicating whether or not a broadcast is to be used in searching for a printer, the IP address to be used when a printer is to be searched by unicast, information indicating a search instruction for searching a printer, and an URI (Uniform Resource Identifier) specifying the Web service unit having a search function, all of which have been set via the user interface provided by the search function setting UI,
   wherein the requesting unit transmits, for each record stored in the storage unit, at a time according to a date and time at which a search is to be performed included in the record, the URI included in the record to the web server unit,
   wherein the web server unit, based on the URI transmit from the requesting unit, identifies the web service unit having the search function, and transmits the information indicating the search instruction for a printer to the identified web service unit,
   wherein the web service unit, after a reception of the information indicating the search instruction for a printer, searches a printer based on the setting that a broadcast is to be used in searching a printer or the IP address of a printer to be searched by unicast, and
   wherein the web server unit, the web service unit, the requesting unit, and the search function setting UI unit are embodied by CPU(s) of the at least one computer apparatus.

2. The computer system according to claim 1, wherein the search function setting UI unit further provides in the UI that an item for setting SNMP (Simple Network management Protocol) community name.

3. The computer system according to claim 1, wherein in the UI provided by the search function setting UI unit, the item for setting the IP address of a printer to be searched by the unicast accepts at least one of a single IP address and a range of consecutive IP addresses, and
   wherein the storage unit stores a record including the designated IP address(es) as those of printer(s) to be searched by unicast.

4. A computer system provided by at least one computer apparatus, comprising:
   a search function setting UI (user interface) unit which provide a user interface including an item for setting a date and time at which a search is to be performed, an item for setting whether or not a broadcast in searching for a printer, an item for adding an IP address of a printer to be searched by unicast to a search target list, and an item for deleting an IP address included in the search target list; and
   a storage unit which stores a plurality of records, each record including the date and time at which a search is to be performed, a setting indicating that a broadcast is to be used in searching for a printer, the IP address included in the search target list and to be used in searching a printer by unicast, all of which have been set via the user interface provided by the search function setting UI; and
   a web service unit which, at a time according to a date and time at which a search is to be performed included in a record, searches a printer based on the setting that a broadcast is to be used in searching a printer and the IP address of a printer to be searched by unicast included in the record, and wherein the web service unit, and the search function setting UI unit are embodied by CPU(s) of the at least one computer apparatus.

5. A method of operating a computer system comprising:

providing a user interface (UI), by a search function setting user interface unit, including an item for setting whether or not a broadcast in searching for a printer, and an item for setting an IP address of a printer to be searched by unicast;

storing a plurality of records, by a storage unit, each record including a date and time at which a search is to be performed, a setting indicating whether or not a broadcast is to be used in searching for a printer, the IP address to be used when a printer is to be searched by unicast, information indicating a search instruction for searching a printer, and an URI (Uniform Resource Identifier) specifying a web service unit having a search function, all of which have been set via the user interface provided by the search function setting UI, transmitting, by a requesting unit, for each record stored in the storage unit, at a time according to a date and time at which a search is to be performed included in the record, the URI included in the record to a web server unit, identifying, by the web server unit, based on the URI transmit from the requesting unit, the web service unit having the search function, and transmitting the information indicating the search instruction for a printer to the identified web service unit, searching, by the web service unit, after a reception of the information indicating the search instruction for a printer, a printer based on the setting that a broadcast is to be used in searching a printer or the IP address of a printer to be searched by unicast, and wherein the web server unit, the web service unit, the requesting unit, and the search function setting UI unit are embodied by CPU(s) of the at least one computer apparatus.

6. The computer system according to claim 4, wherein the search function setting UI unit further provides in the UI that an item for setting SNMP (Simple Network management Protocol) community name.

7. The computer system according to claim 4, wherein in the UI provided by the search function setting UI unit, the item for adding the IP address of a printer to be searched by the unicast to the search target list accepts at least one of a single IP address and a range of consecutive IP addresses, and wherein the storage unit stores a record including the designated IP address(es) as those of printer(s) to be searched by unicast.

8. A method of operating a computer system, comprising:

providing a user interface (UI), by a search function setting user interface unit, including an item for setting a date and time at which a search is to be performed, an item for setting whether or not a broadcast in searching for a printer, an item for adding an IP address of a printer to be searched by unicast to a search target list, and an item for deleting an IP address included in the search target list; and storing a plurality of records, by a storage unit, each record including the date and time at which a search is to be performed, a setting indicating that a broadcast is to be used in searching for a printer, the IP address included in the search target list and to be used in searching a printer by unicast, all of which have been set via the user interface provided by the search function setting UI; and searching, by a web service unit, at a time according to a date and time at which a search is to be performed included in a record, a printer based on the setting that a broadcast is to be used in searching a printer and the IP address of a printer to be searched by unicast included in the record, and wherein the web service unit, and the search function setting UI unit are embodied by CPU(s) of the at least one computer apparatus.

9. The method according to claim 8, wherein in the step of providing, the search function setting user interface unit further provides in the UI that an item for setting SNMP (Simple Network management Protocol) community name.

10. The method according to claim 8, wherein in the UI provided by the search function setting user interface unit, the item for adding the IP address of a printer to be searched by the unicast to the search target list accepts at least one of a single IP address and a range of consecutive IP addresses, and wherein in the step of storing, the storage unit stores a record including the designated IP address(es) as those of printer(s) to be searched by unicast.

* * * * *